(12) United States Patent
Grass

(10) Patent No.: US 6,819,067 B2
(45) Date of Patent: Nov. 16, 2004

(54) CONTACT WASHER SYSTEM AND METHOD FOR CONTROLLING A WINDSCREEN WIPER MOTOR

(75) Inventor: Ansgar Grass, Schutterwald-Langhurst (DE)

(73) Assignee: Robert Bosch GmbH, Stuttgart (DE)

( * ) Notice: Subject to any disclaimer, the term of this patent is extended or adjusted under 35 U.S.C. 154(b) by 14 days.

(21) Appl. No.: 10/169,176

(22) PCT Filed: Sep. 15, 2001

(86) PCT No.: PCT/DE01/03555

§ 371 (c)(1),
(2), (4) Date: Oct. 28, 2002

(87) PCT Pub. No.: WO02/34586

PCT Pub. Date: May 2, 2002

(65) Prior Publication Data

US 2003/0114030 A1 Jun. 19, 2003

(30) Foreign Application Priority Data

Oct. 27, 2000 (DE) .......................... 100 53 303

(51) Int. Cl.$^7$ .................................................. B60S 1/08
(52) U.S. Cl. ........................ 318/164; 318/280; 318/283; 318/445; 318/DIG. 2; 15/250.3; 15/250.12; 15/250.16; 15/250.17; 200/11 R; 200/11 TW
(58) Field of Search ................................. 318/164, 280, 318/283, 443, 445, 483, 430–432, DIG. 2; 15/250.3, 250.12, 250.16, 250.17; 200/11 R–11 TW

(56) References Cited

U.S. PATENT DOCUMENTS

| | | | |
|---|---|---|---|
| 3,659,083 A | | 4/1972 | Winter et al. |
| 3,919,613 A | * | 11/1975 | Steinmann .................... 318/443 |
| 4,329,631 A | * | 5/1982 | Betsch et al. ................. 318/466 |
| 4,355,270 A | * | 10/1982 | Cook et al. ................... 318/443 |
| 4,390,757 A | | 6/1983 | Wiessner |
| 4,559,484 A | * | 12/1985 | Hirano ......................... 318/443 |
| 4,599,605 A | * | 7/1986 | Froeb et al. .................... 341/16 |
| 4,609,794 A | | 9/1986 | Porter |
| 4,614,903 A | * | 9/1986 | Betsch et al. ................. 318/443 |
| 4,625,084 A | * | 11/1986 | Fowler et al. ............ 200/11 DA |
| 4,640,995 A | * | 2/1987 | Naaijer .................... 200/11 DA |
| 4,728,755 A | * | 3/1988 | Fowler et al. ............ 200/11 DA |
| 4,866,357 A | * | 9/1989 | Miller et al. ................. 318/443 |
| 5,128,661 A | * | 7/1992 | Fowler ......................... 345/184 |
| 5,216,340 A | * | 6/1993 | Welch .......................... 318/443 |
| 5,355,061 A | * | 10/1994 | Forhan ......................... 318/443 |
| 5,691,612 A | * | 11/1997 | Corey .......................... 318/444 |
| 5,860,185 A | * | 1/1999 | Ponziani .................... 15/250.13 |
| 5,923,137 A | * | 7/1999 | Amagasa et al. ............. 318/443 |
| 6,028,408 A | * | 2/2000 | Grass ........................... 318/490 |
| 6,069,461 A | * | 5/2000 | Jaworski et al. .............. 318/443 |
| 6,147,466 A | * | 11/2000 | Stronczek ..................... 318/443 |
| 6,249,098 B1 | * | 6/2001 | Miyazaki et al. ............. 318/280 |
| 6,340,801 B1 | * | 1/2002 | Fukuda et al. ................. 200/18 |
| 6,351,088 B1 | * | 2/2002 | Lombardo et al. .............. 318/9 |
| 6,396,230 B1 | * | 5/2002 | Lauk ............................ 318/443 |
| 6,555,980 B2 | * | 4/2003 | Yabe ............................ 318/443 |
| 6,600,281 B2 | * | 7/2003 | Yabe ............................ 318/443 |

FOREIGN PATENT DOCUMENTS

EP 0 102 095 3/1984

* cited by examiner

Primary Examiner—Rina Duda
Assistant Examiner—Tyrone Smith
(74) Attorney, Agent, or Firm—Kenyon & Kenyon

(57) ABSTRACT

The present invention relates to a contact-disk system including a control unit, a rotatable contact disk and a plurality of contact elements, the contact disk having a plurality of paths and each contact element being associated with one path. The paths have electrically conductive segments and electrically insulating segments, logical states being encoded by the electrically conductive segments and the electrically insulating segments. The contact disk has n paths with $n \geq 2$, and N logic states are encoded by the n paths and by the sequence of the electrically conductive segments and the electrically insulating segments, with $N > 2^n$. The present invention also relates to a method for controlling a windshield-wiper motor and a windshield-wiper motor having a contact-disk system according to the present invention.

24 Claims, 2 Drawing Sheets

CONTACT WASHER SYSTEM AND METHOD FOR CONTROLLING A WINDSCREEN WIPER MOTOR

FIELD OF THE INVENTION

The present invention relates to a contact-disk system having a control unit, a rotatable contact disk and a plurality of contact elements, the contact disk having a plurality of paths and each contact element being associated with one path. The present invention also relates to a method for controlling a windshield-wiper motor having a contact-disk system, in which several paths of a rotatable contact disk are contacted by a plurality of contact elements, the paths having electrically conductive segments and electrically insulating segments. The present invention also relates to a windshield-wiper motor.

BACKGROUND INFORMATION

Contact-disk systems may be used to control windshield wipers. A contact disk generally rotates in synchronism with the windshield-wiper motor. Contact elements sweep over the electrically conductive segments and the electrically insulating segments of the contact disk. This provides information about the instantaneous position of the windshield wipers. Generally, for more complicated control processes, e.g., for control processes in which a greater number of windshield-wiper positions are to be encoded, a greater number of paths is required on the contact disk, each of these paths being contacted by at least one contact element.

For example, more windshield-wiper states must be encoded for motor vehicles in which not only the trunk lid but also the rear window may be opened. The rear-wiper motors must be designed so that, when opening the rear window, the wiper arm(s) come to rest in an extended end position (EPP) off the window. This function may be achieved, for instance, by a gearless, reversing rear-wiper motor. In the upper and lower reversing position, this motor is electronically reversed in its polarity, either by double relay or semiconductor H-bridge. If a wiper-arm position in the extended park position is desired, which generally may be located below the park position, the motor will not be reversed in its polarity in the lower reversing position. An oscillating gear motor having reversing electronics may also be used. In this motor, the upper reversing position and the extended park position are mechanically implemented via the gearing. The lower reversing position and the park position, respectively, are electronically implemented, by the motor being reversed in its polarity in the park position, either by double relay or semiconductor H-bridge.

To implement this rear-wiper function mentioned by way of example, six different states should be encoded and transmitted to the reversing electronics in the control unit. The following states may be involved:

upper reversing position;
wiping field;
segment before park position;
park position and lower reversing position, respectively;
segment after park position and between park position and extended park position, respectively;
extended park position.

It may be desirable to use contact disks with as few paths as possible. For instance, it may happen that the contact elements, which are generally implemented as sliding contacts, and the contact paths are located on the same side as the conversion gearing of the oscillating gear-motor. In this manner, there may only be room for two contact paths on the contact disk. Thus, the number of possible encodings is limited.

SUMMARY OF THE INVENTION

An exemplary embodiment according to the present invention builds on the contact-disk system in that the contact disk n has paths with $n \geq 2$ and that logic states are encoded by the n paths and the sequence of electrically conductive segments and the electrically insulating segments N, with $N > 2^n$. An exemplary embodiment according to the present invention may allow a number of encodings that is appropriate for the respective application, notwithstanding the limited number of contact paths on a contact disk. This may be achieved by the control of the contact-disk system not only analyzing the instantaneous logic states, which are generated by the electrically conductive segments and the electrically insulating segments of the contact paths, but also by the control unit additionally recording the transitions between the various states.

The contact disk may have two paths. In this manner, the contact disk may be used in systems in which the sliding contact and the contact paths are located on the same side as the conversion gearing of the oscillating-drive motor.

It is believed that an exemplary embodiment according to the present invention may be advantageous in that six logic states may be encoded by a contact disk having two paths. If two paths are subdivided into electrically conductive and electrically insulating segments, and if, for instance, the electrically conductive segments are identified by logical 0 and the electrically insulating segments by logical 1, combining these bits will result in $2^2 = 4$ encodable states. Thus, it may be possible, for example, to encode six states and thus provide an advantageous control for a rear-wiper motor including extended park position.

An exemplary embodiment according to the present invention may be useful, since a first state corresponds to an upper reversing position, a second state corresponds to a wiping field, a third state is a state before a park position, a fourth state is a park position, a fifth state is a state after a park position and a sixth state is an extended park position. These states may be sufficient to implement the required windshield-wiper functions, which are needed in rear-wiper motors to be used in rear-windows that are capable of being opened.

It is believed to be advantageous that, in the first state, one first path is electrically conductive and a second path is electrically insulating, that, in the second state, the first path and the second path are electrically conductive, that, in the third state, the first path and the second path are electrically insulating, that, in the fourth state, the first path is electrically insulating and the second path is electrically conductive, that, in the fifth state, the first path and the second path are electrically conductive, that, in the sixth state, the first path is electrically conductive and the second path is electrically insulating, and that the states occur consecutively in the order of their numbering. For example, if the fourth state is the park position of the windshield wiper, the contact elements in this state contact one electrically insulating segment of the first path and an electrically conductive segment of the second path. Therefore, the bit combination 1/0 is transmitted to the control unit. If the windshield wiper moves out of the park position in the direction of the wiping field, the control device first receives a bit combination 1/1, corresponding to the third state, and then the bit combination 0/0. However, if the windshield wiper moves out of the park position further towards the extended park position, the bit combination 0/0 is transmitted to the control unit immediately after the bit combination 1/0. Thus, the required information regarding the windshield-wiper states is transmitted to the control unit by the transitions between the states.

It is believed to be advantageous if two contact elements are provided for picking off the state information and if two contact elements are provided for supplying a supply voltage. Two contact elements may be sufficient to pick the state information off the two paths. Two contact elements are useful to supply a supply voltage, since there are states in which not only the first path but also the second path is electrically insulating, which completely insulates segments of the contact disk from one another.

The upper reversing position may be mechanically implemented by an oscillating gear. The park position and the extended park position correspond to lower reversing positions, and the lower reversing position in park position is implemented by reversing the polarity of the motor via the control unit. In this manner, an exemplary contact-disk system according to the present invention may be used in connection with an oscillating-gear motor having reversing electronics.

After switching on the ignition of a motor vehicle or after preselecting a windshield-wiper function when the wiper-arm position is in the park position, an initialization of the contact-disk system may be implemented by leaving the park position and inferring the polarity of the window-wiper motor as a function of the encoding change. In the switched-off state of the ignition of a motor vehicle, the windshield wiper may be in the park position. If the ignition is switched on again, the polarity of the windshield-wiper motor may not be known in the control unit. Therefore, the control unit may also be unaware of the movement direction of the windshield wiper. For this purpose, the windshield wiper, with the currently given polarity of the windshield-wiper motor, is shifted out of the park position. As a function of the adjacent encoding, the control unit will then receive information as to the polarity of the motor, so that all information regarding a subsequent operation is available. After the initialization, the windshield wiper may be guided back again to its park position. To ensure that the wiper arm sweeps over as small an angle as possible during initialization, the segment of the contact disk for the park position should be selected to be as small as possible.

An exemplary embodiment according to the present invention builds on the generic method in that the contact disk n has paths with $n \geq 2$ and that logic states are encoded by the n paths and by the sequence of the electrically conductive segments and the electrically insulating segments N, with $N > 2^n$. A number of encodings may be provided that is appropriate for the respective application, despite a limited number of contact paths on a contact disk. This may be achieved by the control unit of the contact-disk system not only analyzing the instantaneously given logic states, which are generated by the electrically conductive segments and the electrically insulating segments of the contact paths, but also by the control unit also recording the transitions between the various states.

It is believed that an exemplary method according to the present invention may be advantageous when the contact disk has two paths. In this manner, the contact disk may be used in systems in which the sliding contacts and the contact paths are located on the same side as the conversion gearing of the oscillating-drive motor.

Six logic states, for example, may be encoded in case of a contact disk having two paths. If two paths are subdivided into electrically conductive and electrically insulating segments, and if, for instance, the electrically conductive segments are identified by logical 0 and the electrically insulating segments by logical 1, $2^2=4$ states are encodable by combining these bits. An exemplary embodiment according to the present invention may permit, for example, the encoding of six states and thereby provide an advantageous control for a rear-wiper motor including an extended park position.

Furthermore, an exemplary embodiment according to the present invention may be useful because a first state corresponds to an upper reversing position, a second state corresponds to a wiping field, a third state is a state before a park position, a fourth state is a park position, a fifth state is a state after a park position and a sixth state is an extended park position. These states may be sufficient to implement the required windshield-wiper functions, which may be necessary in rear-wiper motors to be used for rear-windows capable of being opened.

It is believed that an exemplary embodiment according to the present invention may be advantageous in that, in the first state, one first path is electrically conductive and a second path is electrically insulating, so that, in the second state, the first path and the second path are electrically conductive, that, in the third state, the first path and the second path are electrically insulating, that, in the fourth state, the first path is electrically insulating and the second path is electrically conductive, that, in the fifth state, the first path and the second path are electrically conductive, that, in the sixth state, the first path is electrically conductive and the second path is electrically insulating, and that the states occur consecutively in the order of their numbering. For example, if the fourth state is the park position of the windshield wiper, the contact elements contact one electrically insulating segment of the first path and one electrically conductive segment of the second path in this state. Therefore, the bit combination 1/0 is transmitted to the control unit. If the windshield wiper moves out of the park position, in the direction of the wiping field, the control device first receives a bit combination 1/1 corresponding to the third state, and then the bit combination 0/0. However, if the windshield wiper moves from the park position further in the direction of the extended park position, the bit combination 0/0 is transmitted to the control device immediately following the bit combination 1/0. Therefore, the required information regarding the windshield-wiper states is transmitted to the control unit by the transitions between the states.

Two contact elements may be provided to pick off the state information, and two contact elements may be provided to supply a supply voltage. Two contact elements may be sufficient to pick the state information off the two paths. Two contact elements for supplying the supply voltage are useful, since there may be states in which not only the first path but also the second path is electrically insulating, which completely insulates segments of the contact disk from one another.

The upper reversing position may be mechanically implemented by an oscillating gear, the park position and the extended park position may correspond to lower reversing positions, and the reversing position in the park position may be implemented by reversing the polarity of the motor via the control system. The electrical polarity reversal may be performed in the park position and the lower reversing position, respectively. In this manner, an exemplary contact-disk system according to the present invention may be used to advantage in connection with an oscillating-drive motor having reversing electronics.

Furthermore, it is believed that an exemplary method according to the present invention may be advantageous in that, after switching on the ignition of a motor vehicle, or after preselecting a windshield-wiper function, an initialization of the contact-disk system is implemented by leaving the park position and inferring the polarity of the windshield-wiper motor as a function of the encoding change. The windshield wiper may be in the park position when the ignition of a motor vehicle is switched off. If the ignition is then switched on again, the control unit may be unaware of the polarity of the windshield-wiper motor. Therefore, the movement direction of the windshield wiper may not be known by the control unit. For this purpose, the windshield wiper with the currently given polarity of the windshield-wiper motor is shifted out of the park position. The control system will then receive information regarding the polarity of the motor as a function of the adjacent coding, so that all the information for a later start-up is available. After initialization, the windshield wiper may be guided back to its park position. To ensure that the wiper arm sweeps over the smallest possible angle during initialization, the contact-disk segment for the park position should be selected as small as possible.

An exemplary embodiment according to the present invention builds on a generic windshield-washer system in that an exemplary contact-disk system is provided in accordance with the present invention. In this way, the advantages of a contact-disk system and an method according to the present invention may be implemented in a windshield-wiper motor.

The present invention is based on the surprising recognition that even in situations in which only a limited number of contact paths may be implemented, for example, two contact paths, a sufficient number of states may be encoded, which may allow controlling rear-wiper motors having an extended park position. An exemplary embodiment according to the present invention may be used in oscillating gear motors having reversing electronics. In addition, the operating method of the washing-water pump may be influenced by letting current flow only during upward wiping because bit combination 0/0 is preceded by bit combination 1/1 during upward wiping, while during downward wiping 0/0 follows 0/1 (upper reversing position).

DETAILED DESCRIPTION

Figure 1:
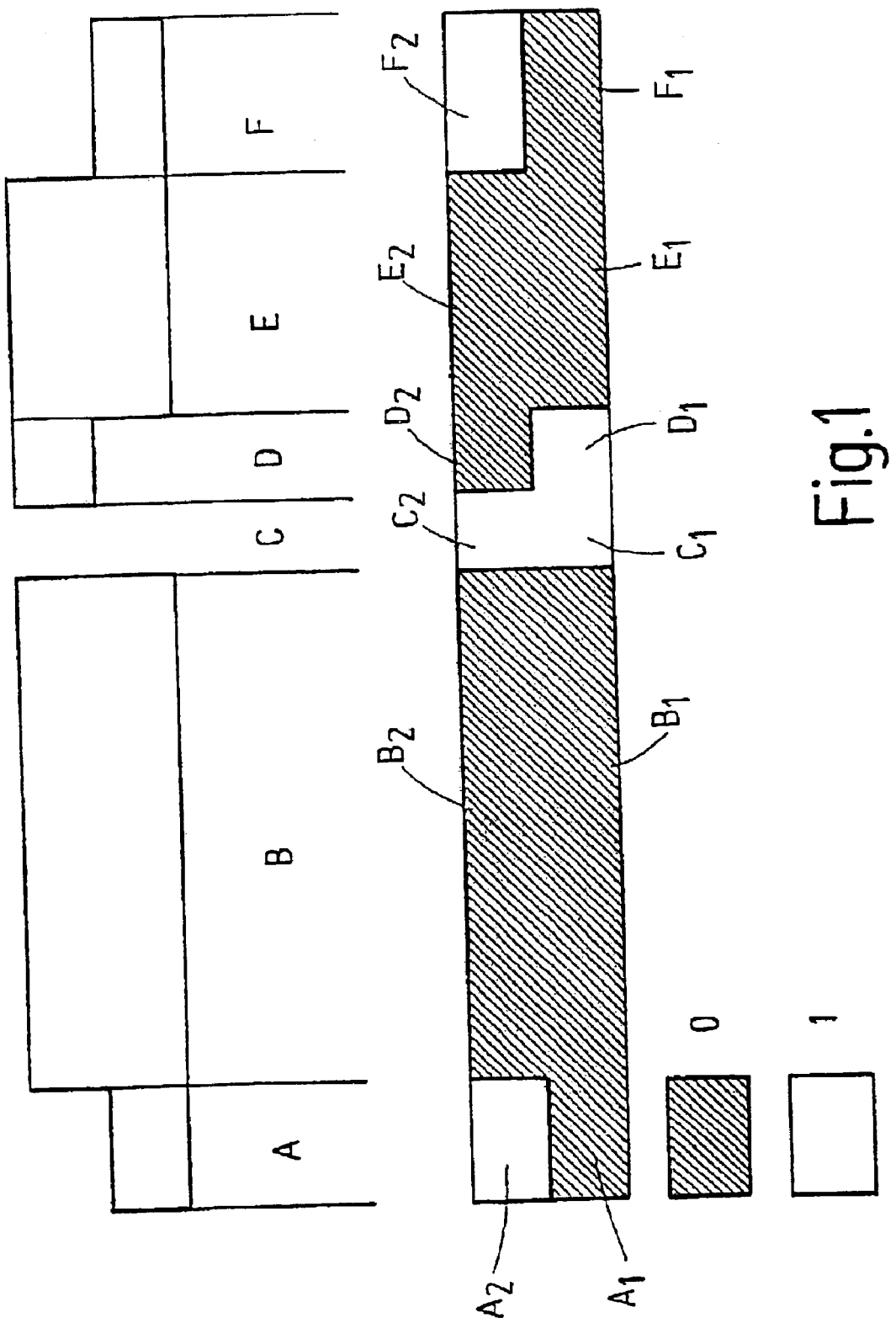
FIG. 1 is a depiction of a plurality of encoded states of a contact-disk system.

FIG. 1 depicts the various logic states of a contact disk. The sectors may correspond, for example, to the different wiper position as follows:

| | State | Contact Path 1 | Contact Path 2 |
|---|---|---|---|
| A | upper reversing position | 0 | 1 |
| B | wiping field | 0 | 0 |

-continued

| | State | Contact Path 1 | Contact Path 2 |
|---|---|---|---|
| C | segment before park position | 1 | 1 |
| D | park position | 1 | 0 |
| E | segment after park position | 0 | 0 |
| F | extended park position | 0 | 1 |

The shaded areas in the depiction according to FIG. 1 are electrically conductive. The white segments adjoining the shaded areas are electrically insulating. For example, the electrically conductive areas may be contacted to ground, so that a contact element touching this area will have a ground signal corresponding to logical 0.

Figure 2:
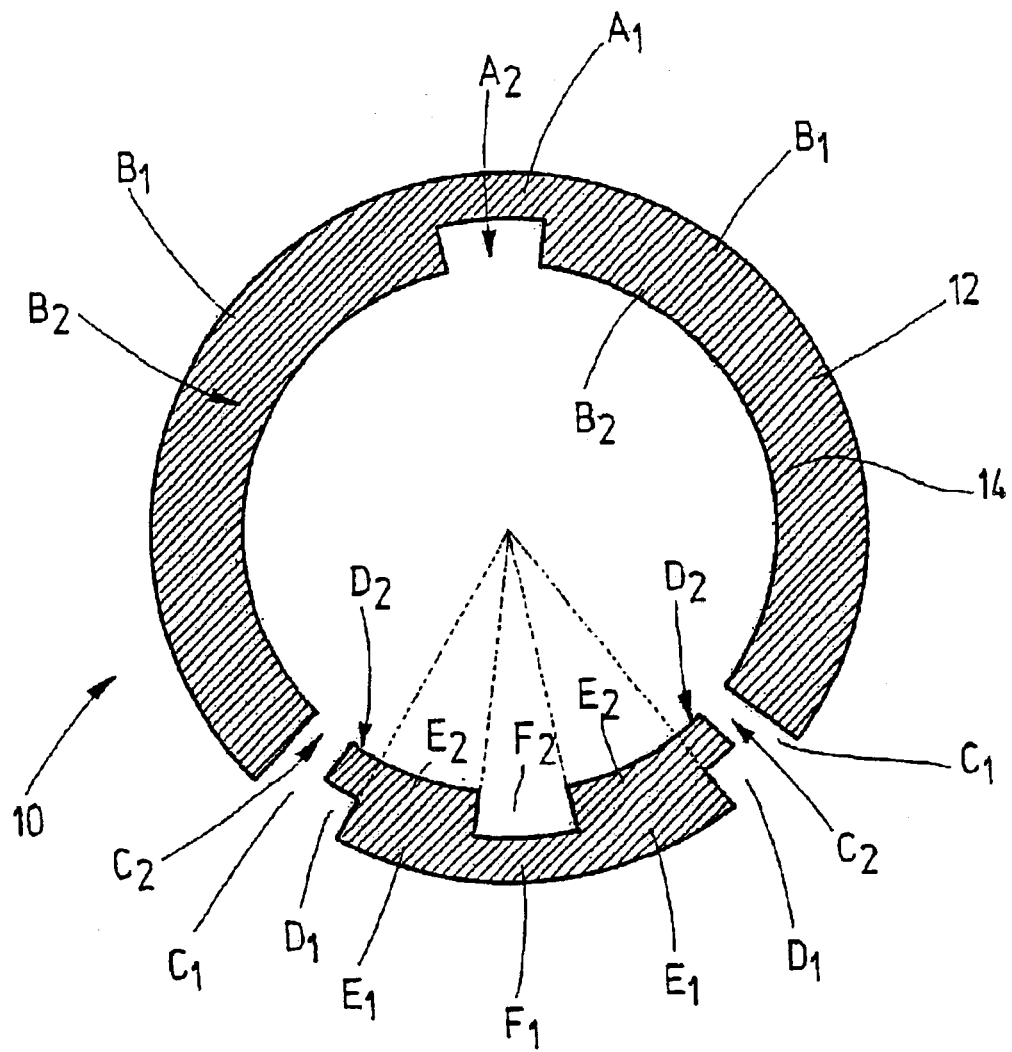
FIG. 2 illustrates an exemplary contact disk according to the present invention.

FIG. 2 shows an exemplary contact disk 10 according to the present invention. Contact disk 10 has two paths 12, 14. These paths are divided into electrically conductive and electrically non-conductive segments, the designations of the segments corresponding to the designations of FIG. 1.

If the wiper arm is in wiping field B after the ignition is switched on, the control unit receives the bit combination 0/0. Until this point, the control unit may not be able to distinguish between the segment after park position E and wiping field B. Subsequently, the wiper moves out of the wiping field, for example, into the segment before park position C. Therefore, the control unit receives the bit combination 1/1. In this manner, it is clear to the control unit that the wiper had initially been in wiping field B, since, if the wiper had been in the segment after park position E, the control unit would have received a bit combination 1/0, which corresponds to park position D, before receiving the bit combination 1/1.

An initialization may be implemented on the basis of the given encoding of contact disk 10 after switching on the ignition. If the wiper arm is in park position D after switching on the ignition, it may not be clear from the bit combination 1/0 alone, which is transmitted to the control unit in the park position, in which direction the wiper arm moves, since the polarity of the motor may not be known. Therefore, current is supplied to the motor after switching on the ignition until park-position segment D is left. By the unambiguous encoding of the adjacent segments, the segment before park position C (1/1) and the segment after park position E (0/0), the control unit may immediately determine in which direction the wiper arm is moving at the given polarity. This information is stored, and the polarity of the motor is reversed again, so that the wiper arm is moved back into park position D. It is useful for this initialization to select the segment of park position D to be as small as possible, so that the wiper arm, for example, sweeps over as small an angle as possible. The initialization may be optionally implemented after switching on the ignition or after selecting a windshield-wiper function.

Upper reversing position A has the coding 0/1. If this information is forwarded to the motor, the motor will not be reversed in its polarity. Instead, the direction of rotation of the contact disk will be maintained, since the wiper arm is mechanically reversed in the upper reversing position A via the oscillating gear. If upper reversing position A is left, the contact disk supplies the bit combination 0/0 in the further course and then the bit combination 1/1, which unambiguously informs the control unit that park position D is being approached, starting from the upper reversing position A. If, after switching on the ignition, the wiper arm were in segment E after the park position, park position D would be reached after letting current flow into the motor, without the bit combination 1/1 occurring for the segment before park position C. in this case, the direction would be determined in an unambiguous manner.

The preceding description of the exemplary embodiments according to the present invention is for illustrative purposes only, and is not intended to restrict the invention. Various changes and modifications may be possible within the framework of the present invention, without leaving the scope of the present invention and its equivalents.

What is claimed is:

1. A contact-disk system for controlling a windshield wiper motor, comprising:
    a control unit;
    a rotatable contact disk having a plurality of paths, the plurality of paths including electrically conductive segments and electrically insulating segments, a plurality of logic states being encoded by the plurality of paths and by the electrically conductive segments and the electrically insulating segments; and
    a plurality of contact elements, each of the contact elements being associated with one of the plurality of paths;
    wherein the plurality of logic states includes more than $2^n$ logic states, n representing a number of the plurality of paths; and
    wherein the plurality of logic states include a first state corresponding to an upper reversing position, a second state corresponding to a wiping field, a third state corresponding to a state before a park position, a fourth state corresponding to a park position, a fifth state corresponding to a state after the park position, and a sixth state corresponding to an extended park position.

2. The contact-disk system according to claim 1, wherein the plurality of paths include two paths.

3. The contact-disk system according to claim 1, wherein in the first state, a first path is electrically conductive and a and the second path is electrically insulating, wherein in the second state, the first path and the second path are electrically conductive, wherein in the third state, the first path and the second path are electrically insulating, wherein in the fourth state, the first path is electrically insulating and the second path is electrically conductive, wherein in the fifth state, the first path and the second path are electrically conductive, and wherein in the sixth state, the first path is electrically conductive and the second path is electrically insulating, the states occurring consecutively in an order of their numbering.

4. The contact-disk system according to claim 1, wherein the upper reversing position and the lower reversing position are mechanically realized by an oscillating gear, the park position and the extended park position correspond to lower reversing positions, and wherein the lower reversing positions are implemented in the park position by reversing the polarity of the motor via the control unit.

5. The contact-disk system according to claim 1, wherein, after one of an ignition of a motor vehicle is switched on and a windshield-wiper function is preselected while the wiper arm is in the park position, an initialization of the contact-disk system is implemented by leaving the park position and inferring the polarity of the windshield-wiper motor as a function of the coding change.

6. A contact-disk system for controlling a windshield wiper motor, comprising:
    a control unit;
    a rotatable contact disk having a plurality of paths, the plurality of paths including electrically conductive segments and electrically insulating segments, a plurality of logic states being encoded by the plurality of paths and by the electrically conductive segments and the electrically insulating segments; and
    a plurality of contact elements, each of the contact elements being associated with one of the plurality of paths;
    wherein the plurality of logic states includes more than $2^n$ logic states, n representing a number of the plurality of paths; and
    wherein the plurality of contact elements include two contact elements provided to measure state information and two contact elements provided to supply a supply voltage.

7. The contact-disk system according to claim 6, wherein the plurality of logic stated include six logic states.

8. The contact-disk system according to claim 6, wherein the plurality of paths include two paths.

9. A method for controlling a windshield-wiper motor, the method comprising the steps of:
    providing a contact-disk system, including a control unit, a rotatable contact disk having a plurality of paths, the plurality of paths including electrically conductive segments and electrically insulating segments;
    providing a plurality of contact elements, each of the contact elements being associated with one of the plurality of paths; and
    encoding a plurality of logic states by the plurality of paths and by the electrically conductive segments and the electrically insulating segments, wherein the plurality of logic states includes more than $2^n$ logic states, n representing a number of the plurality of paths;
    wherein the plurality of logic states include a first state corresponding to an upper reversing position, a second state corresponding to a wiping field, a third state corresponding to a state before a park position, a fourth state corresponding to a park position, a fifth state corresponding to a state after a park position, and a sixth state corresponding to an extended park position.

10. The method according to claim 9, wherein the plurality of paths include two paths.

11. The method according to claim 9, wherein in the first state, a first path is electrically conductive and a second path is electrically insulating, wherein in the second state, the first path and the second path are electrically conductive, wherein in the third state, the first path and the second path are electrically insulating, wherein in the fourth state, the first path is electrically insulating and the second path is electrically conductive, wherein in the fifth state, the first path and the second path are electrically conductive, and wherein in the sixth state, the first path is electrically conductive and the second path is electrically insulating, the states occurring consecutively in an order of their numbering.

12. The method according to claim 9, wherein the upper reversing position and the lower reversing position are mechanically realized by an oscillating gear, the park position and the extended park position correspond to lower reversing positions, and wherein the lower reversing positions are implemented in the park position by reversing the polarity of the motor via the control unit.

13. The method according to claim 9, wherein after one of an ignition of a motor vehicle is switched on and a windshield-wiper function is preselected while the wiper arm is in the park position, an initialization of the contact-disk system is implemented by leaving the park position and inferring the polarity of the windshield-wiper motor as a function of the coding change.

14. A method for controlling a windshield-wiper motor, the method comprising the steps of:
- providing a contact-disk system, including a control unit, a rotatable contact disk having a plurality of paths, the plurality of paths including electrically conductive segments and electrically insulating segments;
- providing a plurality of contact elements, each of the contact elements being associated with one of the plurality of paths; and
- encoding a plurality of logic states by the plurality of paths and by the electrically conductive segments and the electrically insulating segments, wherein the plurality of logic states includes more than $2^n$ logic states, n representing a number of the plurality of paths;
- wherein the plurality of contact elements include two contact elements provided to measure state information and two contact elements provided to supply a supply voltage.

15. The method according to claim 14, wherein the plurality of logic states include six logic states.

16. The method according to claim 14, wherein the plurality of paths include two paths.

17. A windshield-wiper motor, comprising:
- a motor; and
- a contact-disk system coupled to the motor, the contact-disk system including a control unit, a rotatable contact disk having a plurality of paths, the plurality of paths including electrically conductive segments and electrically insulating segments, a plurality of logic states being encoded by the plurality of paths and by the electrically conductive segments and the electrically insulating segments, and a plurality of contact elements, each of the contact elements being associated with one of the plurality of paths, wherein the plurality of logic states includes more than $2^n$ logic states, n representing a number of the plurality of paths, and wherein the plurality of logic states include a first state corresponding to an upper reversing position, a second state corresponding to a wiping field, a third state corresponding to a state before a park position, a fourth state corresponding to a park position, a fifth state corresponding to a state after the park position, and a sixth state corresponding to an extended park position.

18. The windshield-wiper motor according to claim 17, wherein in the first state, a first path is electrically conductive and a second path is electrically insulating, wherein in the second state, the first path and the second path are electrically conductive, wherein in the third state, the first path and the second path are electrically insulating, wherein in the fourth state, the first path is electrically insulating and the second path is electrically conductive, wherein in the fifth state, the first path and the second path are electrically conductive, and wherein in the sixth state, the first path is electrically conductive and the second path is electrically insulating, the states occurring consecutively in an order of their numbering.

19. The windshield-wiper motor according to claim 17, wherein the upper reversing position and the lower reversing position are mechanically realized by an oscillating gear, the park position and the extended park position correspond to lower reversing positions, and wherein the lower reversing positions are implemented in the park position by reversing the polarity of the motor via the control unit.

20. The windshield-wiper motor according to claim 17, wherein, after one of an ignition of a motor vehicle is switched on and a windshield-wiper function is preselected while the wiper arm is in the park position, an initialization of the contact-disk system is implemented by leaving the park position and inferring the polarity of the windshield-wiper motor as a function of the coding change.

21. The windshield-wiper motor according to claim 17, wherein the plurality of paths include two paths.

22. A windshield-wiper motor, comprising:
- a motor; and
- a contact-disk system coupled to the motor, the contact-disk system including a control unit, a rotatable contact disk having a plurality of paths, the plurality of paths including electrically conductive segments and electrically insulating segments, a plurality of logic states being encoded by the plurality of paths and by the electrically conductive segments and the electrically insulating segments, and a plurality of contact elements, each of the contact elements being associated with one of the plurality of paths, wherein the plurality of logic states includes more than $2^n$ logic states, n representing a number of the plurality of paths, and wherein the plurality of contact elements include two contact elements provided to measure state information and two contact elements provided to supply a supply voltage.

23. The windshield-wiper motor according to claim 22, wherein the plurality of paths include two paths.

24. The windshield-wiper motor according to claim 22, wherein the plurality of logic states include six logic states.

* * * * *

UNITED STATES PATENT AND TRADEMARK OFFICE
CERTIFICATE OF CORRECTION

PATENT NO. : 6,819,067 B2
DATED : November 16, 2004
INVENTOR(S) : Ansgar Grass

It is certified that error appears in the above-identified patent and that said Letters Patent is hereby corrected as shown below:

Column 8,
Line 15, change "plurality of logic stated" to -- plurality of logic states --.

Signed and Sealed this

Eighth Day of November, 2005

JON W. DUDAS
*Director of the United States Patent and Trademark Office*